3,455,866
THERMOPLASTIC FRICTION COMPOSITION AND FRICTION ELEMENT THEREOF
William J. D'Alessandro, Old Bridge, N.J., assignor to Union Carbide Corporation, a corporation of New York
No Drawing. Filed Nov. 24, 1964, Ser. No. 413,624
Int. Cl. C08g *43/00;* F16d *69/02*
U.S. Cl. 260—37                                                    8 Claims

ABSTRACT OF THE DISCLOSURE

Thermoplastic friction elements formed from a composition of particulate friction material and thermoplastic polyarylene polyether as the binder therefor.

---

This invention relates to thermoplastic friction composition and friction element thereof. More particularly, this invention relates to thermoplastic polyarylene polyether friction composition and friction element thereof such as a brake lining.

It is known that friction elements which are intended for heavy duty brake or clutch operations in motor vehicles must withstand severe service conditions. In use they are subjected to rigorous treatment by repeated and oftentimes prolonged braking or clutching applications which develop high temperatures, above 500° F., in the friction elements, these temperatures frequently exceeding 1000° F. on the friction surface of the elements and progressively decreasing inwardly of such surface. These high temperatures, especially when occurring during high speed stops or following repeated applications of the brakes tend to depolymerize or otherwise decompose the organic binder substances heretofore employed as the principal essential ingredients of the binders in the friction elements, such ingredients comprising vulcanizable natural rubber with or without vulcanizable synthetic rubber additions, and/or various thermosetting resins such as phenol-aldehyde resins and oil modified resins. Decomposition of the friction material results in the formation of gaseous or liquid products of heat decomposition. In some cases this causes marked softening of the friction element with consequent loss of braking efficiency. In other cases, the depolymerized or otherwise liquid products of heat decomposition appear on the friction surface of or within the friction elements so as to cause the friction elements heretofore employed to exhibit a loss of stability of friction characteristics originally existing, and to produce after vigorous braking application a condition which automotive engineers customarily refer to as "lining fade."

In many instances the aforesaid liquefied decomposition products may produce a glaze on the surface of the friction element. This glaze must be removed by subsequent brake or clutch operations to restore the original surface conditions. If subsequent operations are unable to eradicate the glaze, the friction element will remain at a low level of friction and yield an unsafe functioning of the device in which it is used. Moreover, the aforesaid decomposition may in some instances cause an excess of abrasive material of the lining composition to be present on the friction surface and produce a condition known as "over recovery," the friction element then having a coefficient of friction upon cooling exceeding that which the friction element possessed originally. Since it is desirable to maintain the stability of friction characteristics of the friction elements, it will be understood that these conditions are to be inhibited and preferably avoided.

A further problem heretofore associated with known friction elements has been the impossibility to achieve in a satisfactory manner a relatively high level of substantially uniform friction action over a wide temperature range of the friction element. By high level of friction we mean a coefficient above 0.4. This property is much sought after because modern brake and clutch operations can be made more effective if the friction elements possess this feature. It will be understood for instance that for braking stops made at the same speed and at the same rate of deceleration, a friction material which possesses a high level of friction action and which is capable of maintaining the same over a wide temperature range will provide more positive response and will require a lower pedal effort than would be true of a conventional friction material neither possessing a uniform level of friction action or a high friction ability over a substantial temperature range.

As stated above, vulcanizable rubbers and various thermosetting resins have heretofore been employed as the bonding agent in friction compositions and elements. These bonding agents in handling characteristics suffer from drawbacks such as the inconvenience and difficulty or handling and mixing several components which includes liquids and volatiles and prolonged cure cycles. Thermoplastic materials, on the other hand, while exhibiting superior handling characteristics, have been found to be completely unsuitable for use in friction applications because of their generally poor bonding properties and their notoriously poor thermal and dimensional stability at elevated temperatures such as those encountered in friction applications.

It is therefore, an object of this invention to provide a friction composition and friction element thereof which combines the best attributes of both thermosetting resins and thermoplastic resins but which eliminates the drawbacks heretofore met with thermosetting and thermoplastic resins.

It is another object of this invention to provide a thermoplastic friction composition which is superior in handling characteristics over thermosetting friction compositions.

It is yet another object of this invention to provide a thermoplastic friction element which is superior in friction characteristics over thermosetting friction elements.

It is a further object of this invention to provide a thermoplastic friction element possessing exceptional friction stability under all of the severe conditions encountered in friction applications over a wide temperature range and at high temperatures.

It is a further object of this invention to provide a thermoplastic friction element having better fade resistance than known thermosetting friction elements commercially available. Moreover, the thermoplastic friction element of the present invention recover rapidly after excessive heating when use has produced a fading condition and does not over-recover on cooling but returns substantially to its original friction level.

Broadly, the thermoplastic friction composition of this invention and elements formed therefrom comprise a major portion by weight of a particulate friction material the greater portion of which is a filamentous friction material and a binding amount, that is an amount sufficient to bind the friction material, of a thermoplastic polyarylene polyether binder, described in greater detail below.

The thermoplastic friction element of this invention is fabricated from the composition by conventional thermoplastic forming techniques from the composition as is described in more detail herein. The thermoplastic friction elements of this invention exhibit at least equivalent wear factors, superior stability, higher coefficients of friction, better fade resistance, and lower variation in coefficient of friction over a 200°–300° C. test temperature range as compared to currently used thermosetting friction compositions and elements.

Thermoplastic polyarylene polyethers used as the binder in this invention are linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are referred to in this manner as the polymer is conveniently made by the reaction of an alkali metal double salt of a dihydric phenol and a dihalobenzenoid compound having the electron withdrawing group by techniques as herein described.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenol alkanes or the nuclear halogenated derivatives thereof, which are commonly known as "bisphenols," such as, for example, the 2,2-bis-(4-hydroxyphenyl)propane, 1,1-bis-(4-hydroxyphenyl)-2-phenyl ethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example either

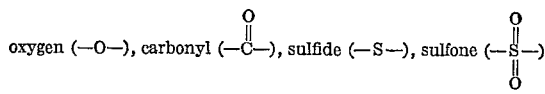

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure

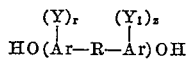

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as

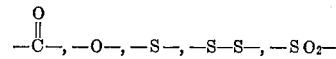

and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis-(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl) - 1 - phenylpropane, 2,2-bis-(4-hydroxyphenyl)-1,1,1,3,3,3-hexafluoropropane and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy - 3 - isobutylphenyl)ether, bis-(4-hydroxy-3-isopropylphenyl)ether, bis-(4-hydroxy-3-chlorophenyl)ether, bis - (4-hydroxy-3-fluorophenyl)ether, bis-(4-hydroxy-3-bromophenyl)ether, bis-(4-hydroxynaphthyl)ether, bis-(4-hydroxy-3-chloronaphthyl)ether, 4,4'-dihydroxy-3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus, when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds.

Preferred are the strong activating groups such as the sulfone group

bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent group which can activate displacement of halogens on two different rings, such as the sulfone group

the carbonyl group

the vinyl group

the sulfoxide group

the azo-group —N=N—; the saturated fluorocarbon groups —CF$_2$CF$_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

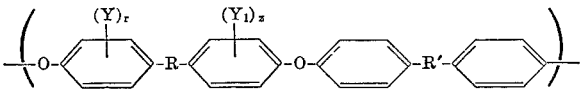

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms and alkoxyl groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is a divalent connecting radical

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula

wherein each R represents a monovalent lower hydrocarbon group free of aliphatic unsaturation on the alpha carbon atom, and preferably contains less than about 8 carbon atoms or when connected together represents a divalent alkylene group with $z$ being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihaloenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C., are preferred. More preferred are temperatures between about 120° to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

As stated above, the thermoplastic friction composition and elements thereof of this invention comprise a major portion by weight of a particulate friction material and a binding amount of a thermoplastic polyarylene polyether binder.

The phrases "friction composition" and "friction element" as used herein and in the appended claims is intended to be descriptive of that class of compositions and elements used to develop a high coefficient of friction when applied against a surface without substantially cutting, wearing away or rubbing off that surface but which are designed to gradually wear away in use to maintain the original surface conditions of the friction composition and element. For this reason, the major portion of the particulate friction material, that is, the filamentous friction material, cannot be harder than the surface against which the friction compositions and elements of this invention are applied.

It is preferred that the particulate friction material be heat resistant and essentially composed of filamentous and granular friction materials. Best results are attained when the filamentous ingredients predominate and constitute at least about 50% by weight of the friction material. In this connection, long, medium or short asbestos fiber such as crysotile asbestos is preferred for its desirable high heat resistant handling and reinforcing properties. Moreover, best performance is obtained when particulate materials are inorganic in character although a substantial portion may be organic when in a form heated to render them substantially infusible at temperatures of 600° F. and preferably higher. Normally it is preferred not to use organic particulate ingredients in amount exceeding about 30% by weight of the friction material and not more than about 5% to 10% when such materials have not been heat treated as aforesaid.

Examples of filamentous particulate materials which may be used are inorganic fibers such as asbestos fiber, steel wool, bronze fiber, glass fiber, and calcium silicate fiber; organic fibers such as cellulose fiber and synthetic resin fibers such as polyacrylonitrile fiber, polyethylene terephthalate fiber, and synthetic resin fibers of these types heat treated to render them infusible at temperatures at 600° F. and higher.

Suitable asbestos fiber has a grade of 1 to 9, preferably 3 to 7, as graded by the Quebec Screen Test (Ross, J. G., Can. Dept. Mines, Mines Branch No. 707, 50–51 (1931), as revised Dec. 1, 1942). Other filamentous friction materials can be graded by this test but in any case the filamentous material should not be harder than the surface against which the friction compositions and elements of this invention are applied.

Other particulate friction materials conventionally used in friction compositions can also be present in the thermoplastic friction compositions and elements of this invention. Such materials are employed to densify, to adjust the thermal properties, and to fortify and/or control friction. Still other materials are used to impart special properties such as, for example, resistance to moisture sensitivity, wear and noise.

Examples of other particulate friction materials are barium sulfate, cork dust, silica, mica, metal particles, litharge, clay, calcium oxide, zinc oxide, barytes, rotten stone, zinc dust, Alundum, graphite, molybdenum disulfide, iron oxide, and organic friction particles such as Cardolite 753. Cardolite 753 is an organic particulate resin made by Minnesota Mining and Manufacturing Company. It is prepared by reacting together and heat curing to the infusible state the residue of the distillation of cashew nut shell liquid, furfural and diethyl sulfate, as described in U.S. Patent No. 2,317,587 and then comminuting the infusible mass to a granular material.

The components of the thermoplastic friction compositions and elements of this invention can be employed in amounts normally employed in conventional friction compositions and elements. For example, friction material as defined herein is employed in a major amount by weight, that is, in amounts ranging between about 70 to about 95 percent by weight. Weight percentages as used herein and in the appended claims are based on the total dry weight of the friction composition or element.

A binding amount of the thermoplastic polyarylene polyether binder, that is, an amount sufficient to bind together the particulate friction material, will, of course, depend on the amount of friction material used and the kinds and number of components present in the friction material. Generally, binder amounts falling within the range of from about 5 to about 30 percent by weight are suitable. This is somewhat surprising since conventional rubber and thermosetting binders are rarely employed in amounts of less than 10 percent by weight and generally in amount much in excess of 10 percent.

In general, it can be stated that in order to obtain complete and adequate bonding, the components of the composition are mixed and/or molded under conditions which allow for complete and thorough wetting of the particulate friction material by the thermoplastic polyarylene polyether binder. Wetting can be accomplished by fluxing (flow under heat and usually pressure) the binder while in contact with the friction material by mixing a solution of the binder in a suitable solvent such as chloroform, monochlorobenzene, methylene chloride and the like, with the friction material and by like and equivalent methods.

The mixing of the components of the composition can be accomplished in any convenient manner so long as there is attained a thorough admixture of the components. Suitable apparatus for accomplishing this end include a kneader, a 2-roll mill, Banbury mixer, an extruder, and the like.

It should be evident that the compositions of this invention can be prepared for use in either a dry or wet form. In the dry form, the friction material would be admixed with thermoplastic polyarylene polyether binder in particulate form, for instance powdered, granulated and the like, while in the wet form, they would be admixed with a solution of the thermoplastic polyarylene polyether binder dissolved in a suitable solvent.

The compositions of this invention, either in the dry or wet form, can be molded into friction elements by conventional thermoplastic fabricating techniques, such as those described in detail in the examples. For example, a dry or wet composition can be compression molded directly in a suitably shaped mold into a friction element. Or, if desired, a dry or wet composition can be formed into a "preform" which can then be formed into the desired shape in a suitably shaped mold by compression molding. Such an intermediate preform has particular utility since the composition and preform can be easily prepared by a plastics fabricator having conventional equipment and sold to a special manufacturer equipped to form friction elements. The composition in dry or wet form could also be prepared and sold by itself to a manufacturer of friction elements.

The thermoplastic friction composition and preforms thereof of this invention can be readily formed into friction elements such as clutch facings and brake facings and linings for use in all types of manual and power driven vehicles such as, railway cars, wagons, carriages, automobiles, buses, tractors, trailers, trucks, trains, cycles, sleds and the like. The thermoplastic friction element of this invention is particularly useful as a brake lining for power and manual brakes in automobiles.

The following examples are intended to further illustrate the present invention without limiting the same in any manner. All parts and percentages are by weight unless indicated otherwise.

In the following examples and controls, compositions were prepared by either a dry or wet process. In the dry process, the friction material and powdered resin were mixed in a kneader for 15 minutes until a uniform mixture was obtained. The mixture was tumbled in a quart can on rolls for about 10 minutes. The mixture was subsequently molded into 2" x 1" x 5/16" thick curved brake lining specimens at 300° F. for 10 minutes using sufficient pressure (about 3000–4000 lbs. ram pressure) to completely close the mold. Gases were vented from the mold after the first and third minute. The specimens, which had a density of 2.0 gm./cc., were then postcured at 360° F. for 16 hours.

In the wet process, the friction material and polymer solution were mixed in a kneader for 10 minutes until a uniform mixture was obtained. The mixture was then fed into a water-jacketed hopper of a 2" Bonnot extruder (manufactured by the Bonnot Company, division of the C. L. Goulger Machine Company, Canton, Ohio) equipped with a 1.5 horsepower variable speed drive and a socket-mounted extrusion worm. A 1-inch ribbon 3/8-inch thick was extruded from the mixture. The ribbon was dried at 175° F. for 8–16 hours and cut into 2 inch lengths which were subsequently molded into 2" x 1" x 5/16" thick curved brake lining specimens at 300° F. for 10 minutes using sufficient pressure (about 3000–4000 lbs. ram pressure) to completely close the mold. Gases were vented from the mold after the first and third minute. The specimens, which had a density of 1.8 gm./cc. were postcured at 360° F. for 16 hours.

After burnishing, the brake lining specimens were tested for coefficient of friction (COF) and wear in a Carson Friction Machine. The 12 inch diameter cast iron brake drum of this machine was heated to the desired temperature and rotated at 375 r.p.m. Two weights were employed to hold the brake lining specimens against the inside of the rotating brake drum surface and apply the desired bearing pressure. Before testing each specimen was held against the rotating brake drum surface at 200° C. until the surface was smooth with at least 95% of the surface area worn. After weighing each specimen, it was put through a series of test cycles each comprising applying the bearing pressure for 2 minutes and removing the specimen from the surface of the rotating drum for one-half minute. In testing at 200° C., two identical specimens were put through 16 test cycles and the coefficient of friction values recorded and averaged. In testing at 300° C., the same procedure as for 200° C. was followed except that the specimens were put through 8 test cycles. Each specimen was weighed after testing and the weight loss recorded. The data obtained was used to calculate the coefficient of friction and wear factor using the following equations:

(1) Coefficient of Friction (COF)=tangential force* p.s.i./normal force** p.s.i.

*The tangential force at the face of the brake lining specimen was measured with a Hagen Thrust Torque unit and recorded on an Esterline Angus quick-trip pressure recorder.
**The normal force is the pressure applied to a specimen by the two weights used to hold it against the inside of the rotating brake drum.

(2) Work done=(0.178) (COF) (N)
where N=the number of test cycles.

(3) Wear factor=specimen weight loss/work done

Reduced viscosity of the polyarylene polyether (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

All parts and percentages are by weight unless indicated otherwise.

EXAMPLE 1

Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis-(4-hydroxyphenyl)propane (0.05 moles), 13.1 grams of a 42.8% potassium hydroxide solution (0.1 moles KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C., consisting of the dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° with good stirring for 4–5 hours. The viscous, orange solution was poured into 300 ml. water, rapidly circulating in a Waring Blendor, and the finely divided white polymer was filtered and then dried in a vacuum oven at 110° for 16 hours. The yield was 22.2 g. (100%) and the reaction was 99% complete based on a titration for residual base.

The polymer had the basic structure

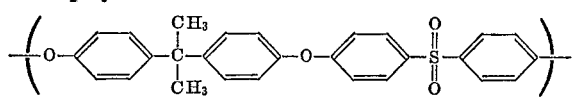

Composition C:
  Friction material—
    Asbestos fibers _____ 61
    Barium sulfate _____ 24
  Binder—
    Thermoplastic polyarylene polyether
      solids [3] _____ 15

Composition D:
  Friction material—
    Asbestos fibers _____ 65
    Barium sulfate _____ 25
  Binder—
    Thermoplastic polyarylene polyether
      solids [4] _____ 10

Control I:
  Friction material—
    Asbestos fibers _____ 57.5
    Barium sulfate _____ 22.5
  Binder—
    Phenolic resin solids [5] _____ 20.0

Control II:
  Friction material—
    Asbestos fibers _____ 57.5
    Barium sulfate _____ 22.5
  Binder—
    Pulverized phenolic resin [6] _____ 20.0

[1] Prepared as in Example 1 having a reduced viscosity of 0.49. In monochlorobenzene solvent containing 45% polymer solids.
[2] Prepared in Example 1 having a reduced viscosity of 0.49. In a solvent comprising 54% methylene chloride and 23% toluene containing 23% polymer solids.
[3] Same as in Composition A.
[4] Prepared as in Example 1 having a reduced viscosity of 0.49. In monochlorobenzene solvent containing 35% polymer solids.
[5] 70% solids solution of an oil modified 2-step novolak phenol-formaldehyde novolak resin containing 10% hexamethylenetetramine hardener, sold under the designation CRS by the Union Carbide Corporation.
[6] A pulverized phenol-formaldehyde 2-step novolak resin containing 6.5% hexamethylenetetramine hardener, sold under the designation BRP by the Union Carbide Corporation.

EXAMPLE 2

Four brake lining specimens of each composition and control were prepared and tested for coefficient of friction and wear factor at 200° C. and 300° C. Results are summarized in Table I.

TABLE I

| | Lining preparation process | Coefficient of friction | | Wear factor | |
|---|---|---|---|---|---|
| | | 200° C. | 300° C. | 200° C. | 300° C. |
| Composition A | Wet | 0.58 | 0.61 | 0.22 | 1.10 |
| Composition B | Wet | 0.46 | 0.53 | 0.27 | 0.92 |
| Composition C | Wet | 0.59 | 0.59 | 0.27 | 1.00 |
| Composition D | Wet | 0.63 | 0.63 | 0.52 | 1.47 |
| Control I | Wet | 0.48 | 0.44 | | |
| Control II | Dry | 0.44 | 0.51 | 0.19 | 0.85 |

In the examples the following compositions were prepared as described above and brake lining specimens molded therefrom also as described above.

Composition A:
  Friction material—                       Percent
    Asbestos fibers _____ 57.5
    Barium sulfate _____ 22.5
  Binder—
    Thermoplastic polyarylene polyether
      solids [1] _____ 20

Composition B:
  Friction material—
    Asbestos fibers _____ 57.5
    Barium sulfate _____ 22.5
  Binder—
    Thermoplastic polyarylene polyether
      solids [2] _____ 20.0

Table I demonstrates the improved and more stable (faster surface regeneration action) friction performance of the thermoplastic brake linings of this invention over currently used thermosetting brake lining compositions at both equivalent, and, more importantly, lower binder contents.

In processing, compositions A, B, and C were found to be superior to control I in extrudability, green strength, and post formability.

EXAMPLE 3

A brake lining specimen was made from composition A as described above except molding was carried out at 550° F. instead of at 300° F. and the postcuring step was eliminated. Friction and wear performance of the specimen molded from composition A was the same as in Example 2 indicating that the thermoplastic friction composition of this invention can be fabricated with ease into friction elements as compared to prior thermosetting compositions.

EXAMPLE 4

One brake lining specimen was prepared from composition B and Control II and tested through 4 test cycles for friction at 100° C. under varying bearing pressures. Results are summarized in Table II.

TABLE II

| Lining preparation process | Coefficient of friction at 100° C. | | |
|---|---|---|---|
| | 50 p.s.i. | 75 p.s.i. | 100 p.s.i. |
| Composition B ...... Wet ........ | 0.46 | 0.38 | 0.46 |
| Control II .......... Dry ........ | 0.44 | 0.35 | 0.34 |

The brake lining specimen of composition B was also found to give more uniform individual friction cycles while Control II showed some evidence of friction fade. This example demonstrates that the thermoplastic brake linings and compositions of this invention give a superior friction performance over a wide range of bearing pressures as compared to currently used thermosetting brake lining compositions.

EXAMPLE 5

One brake lining specimen was prepared from each of compositions A, B, C, and D and Control II and subjected to continuous friction tests over a wide range of temperature. Results are summarized in Table III.

TABLE III

| | Coefficient of friction | | | | |
|---|---|---|---|---|---|
| | Compositions | | | | |
| Temp., °F. | A | B | C | D | Control II |
| 250 | | 0.45 | 0.50 | 0.59 | |
| 300 | 0.51 | 0.50 | 0.52 | 0.59 | 0.35 |
| 400 | 0.57 | 0.52 | 0.54 | 0.62 | 0.42 |
| 500 | 0.61 | 0.54 | 0.57 | 0.64 | 0.48 |
| 600 | 0.65 | 0.54 | 0.58 | 0.64 | 0.68 |
| 700 | 0.60 | 0.50 | 0.55 | 0.68 | 0.68 |
| 750 | 0.60 | 0.50 | 0.55 | 0.76 | 0.60 |

This example illustrates the greater friction stability (less change in friction with the temperature increase) of the thermoplastic friction elements of this invention as compared to currently used thermosetting friction elements. In Table III, control II goes from a 0.35 COF at 300° F. to a peak value of 0.68 at 600° F. and then fades at 700° F. in a test period of 18 minutes. Compositions A, B, and C, on the other hand reach a high COF at 300° F. (0.51, 0.50, and 0.52 respectively) and maintain a stable COF level up to a test temperature of 750° F. with no sign of fade in a 25 minute test period for composition A and a 50 minute test period for compositions B and C. Even more outstanding is the performance of composition D. With only one-half of the binder content of control II, composition D reached a very desirable high COF of 0.59 at 250° F. and maintained at least this level of friction through the test run, and, quite surprisingly, instead of fading as did control II, actually showed an increase in COF to 0.76 at the 750° F. test temperature.

EXAMPLE 6

Thermoplastic polyarylene polyether having the formula:

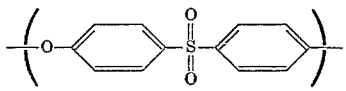

is prepared from 4,4′-dihydroxydiphenyl sulfone and 4,4′-dichlorodiphenyl sulfone according to the procedure in Example 1. This polymer is substituted for the polyarylene polyether of composition A and formed into a brake lining specimen by the wet process described above. The brake lining specimen is characterized by superior friction performance as compared to controls I and II.

EXAMPLE 7

Thermoplastic polyarylene polyether having the formula:

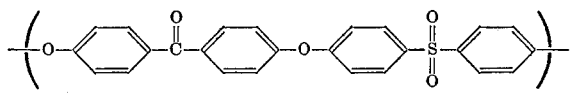

is prepared from the bisphenol of benzophenone and 4,4′-dichlorodiphenylsulfone according to the procedure in Example 1. This polymer is substituted for the polyarylene polyether of composition A and formed into a brake lining specimen by the wet process described above. The brake lining specimen is characterized by superior friction performance as compared to controls I and II.

EXAMPLE 8

Thermoplastic polyarylene polyether having the formula:

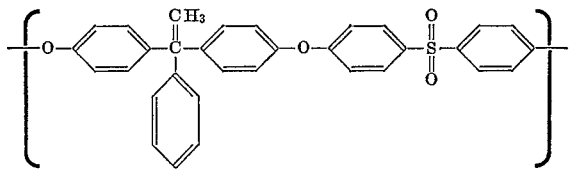

is prepared from the bisphenol of acetophenone and 4,4′-dichlorodiphenylsulfone according to the procedure in Example 1. This polymer is substituted for the polyarylene polyether of composition B and formed into a brake lining specimen by the wet process described above. The brake lining specimen is characterized by superior friction performance as compared to controls I and II.

EXAMPLE 9

Thermoplastic polyarylene polyether having the formula:

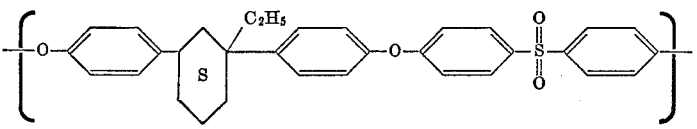

is prepared from the bisphenol of vinyl cyclohexene (prepared by an acid catalyzed condensation of 2 moles of phenol with one mole of vinyl cyclohexene) and 4,4′-dichlorodiphenylsulfone according to the procedure in Example 1. This polymer is substituted for the polyarylene polyether of composition A and formed into a brake lining specimen by the wet process described above. The brake lining specimen is characterized by superior friction performance as compared to controls I and II.

EXAMPLE 10

Thermoplastic polyarylene polyether having the formula:

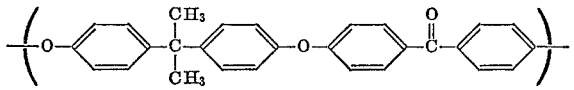

is prepared from 2,2′-bis-(4-hydroxyphenyl)propane and 4,4′-difluorobenzophenone according to the procedure in Example 1. This polymer is substituted for the polyarylene polyether of composition B and formed into a brake lining specimen by the wet process described above. The brake lining specimen is characterized by superior friction performance as compared to controls I and II.

I claim:

1. Thermoplastic friction engaging element formed from a composition comprising a major portion by weight of a particulate friction material the greater portion of which is a filamentous friction material and a binding amount of a linear thermoplastic polyarylene polyether binder having a reduced viscosity in chloroform above about 0.35 composed of recurring units having the formula:

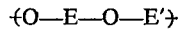

wherein E is the residuum of the dihydric phenol and E′ is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

2. Thermoplastic friction engaging element formed from a composition comprising a major portion by weight of a particulate friction material the greater portion of which is a filamentous friction material and a binding amount of a linear thermoplastic polyarylene polyether binder having a reduced viscosity in chloroform above about 0.35 composed of recurring units having the formula

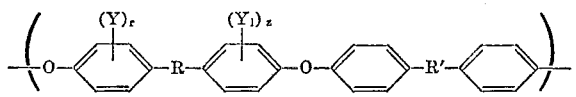

wherein R represents a member of the group consisting of a bond between aromatic carbon atoms and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive.

3. Composition defined in claim 1 wherein said polyarylene polyether is composed of recurring units having the formula

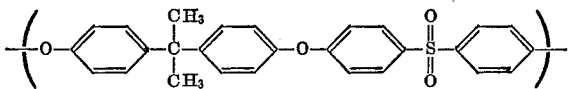

4. Composition defined in claim 1 wherein said polyarylene polyether is composed of recurring units having the formula

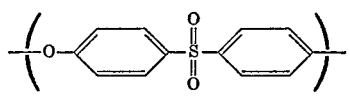

5. Thermoplastic friction engaging element formed from a composition comprising, by weight, based on the weight of said composition, from about 70 to about 95 percent of a particulate friction material the greater portion of which is a filamentous friction material, and from about 5 to about 30 percent of a linear thermoplastic polyarylene polyether binder having a reduced viscosity in chloroform above about 0.35 composed of recurring units having the formula

wherein E is the residuum of a dihydric phenol and E′ is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

6. Composition defined in claim 5 wherein said polyarylene polyether is composed of recurring units having the formula

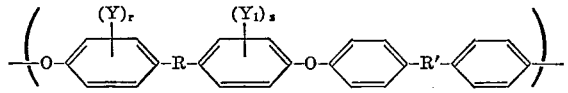

wherein R represents a member of the group consisting of a bond between aromatic carbon atoms and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive.

7. Composition defined in claim 5 wherein said polyarylene polyether is composed of recurring units having the formula

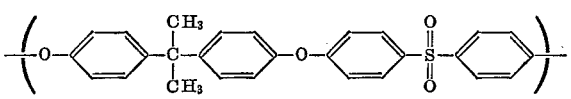

8. Composition defined in claim 5 wherein said polyarylene polyether is composed of recurring units having the formula

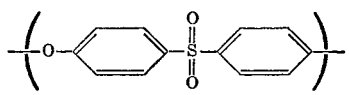

References Cited

UNITED STATES PATENTS

| | | | |
|---|---|---|---|
| 3,179,631 | 4/1965 | Endrey | 51—298 |
| 3,264,536 | 7/1966 | Robinson et al. | 260—49 |

FOREIGN PATENTS

| | | |
|---|---|---|
| 650,476 | 1/1965 | Belgium. |
| 938,931 | 10/1963 | Great Britain. |

OTHER REFERENCES

W. F. Christopher and D. W. Fox, Polycarbonates Reinhold Publishing Corporation, New York, 1962. Call No. TP 156, P 6 C4C–5. Pages 151–54.

MORRIS LIEBMAN, Primary Examiner

L. T. JACOBS, Assistant Examiner

U.S. Cl. X.R.

188—250